S. W. FRANSSON.
SLED RUNNER FOR BABY CARRIAGES.
APPLICATION FILED APR. 9, 1912.
1,068,120.
Patented July 22, 1913.
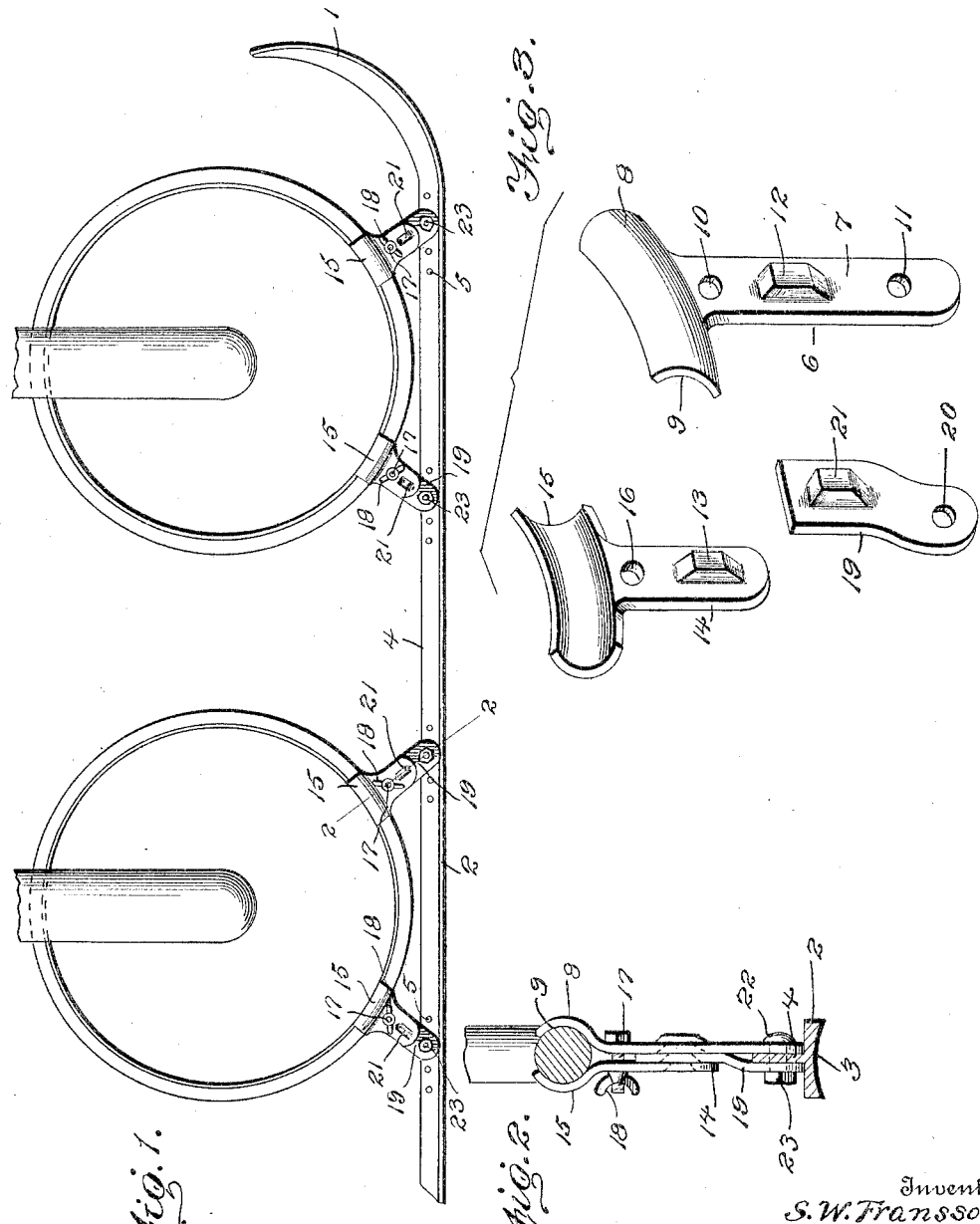
Inventor
S. W. Fransson.

UNITED STATES PATENT OFFICE.

SVEN W. FRANSSON, OF BROOKLYN, NEW YORK.

SLED-RUNNER FOR BABY-CARRIAGES.

1,068,120. Specification of Letters Patent. Patented July 22, 1913.

Application filed April 9, 1912. Serial No. 689,620.

*To all whom it may concern:*

Be it known that I, SVEN W. FRANSSON, citizen of the United States, residing at Brooklyn, in the county of Kings and State of New York, have invented certain new and useful Improvements in Sled-Runners for Baby-Carriages, of which the following is a specification.

This invention is an attachment for baby carriages and has for its object the provision of a simple, efficient, and inexpensive device by which sled runners may be attached to the wheels of a baby carriage so that the vehicle may be used in the winter as well as in the summer.

A secondary object of the invention is to provide a construction whereby the device may be fitted to any carriage and may be rapidly secured to or detached therefrom.

The invention is illustrated in the accompanying drawings, and will be hereinafter first fully described and then more particularly pointed out in the appended claims.

In the drawings:—Figure 1 is an elevation of my sled runner showing the same applied to two wheels of a baby carriage. Fig. 2 is a section on the line 2—2 of Fig. 1. Fig. 3 is a detail view showing the parts of the device in perspective and separated but in the relative positions they occupy when assembled.

In carrying out my invention, I employ a runner 1 having its front end upturned, as will be readily understood, and consisting preferably of an inverted T-bar having its head 2 forming a shoe and preferably grooved longitudinally, as shown in Fig. 2, at 3, although the under or riding surface may be flat, if preferred. The stem of the T-bar, 4, constitutes an attaching rib and is provided with series of transverse openings 5 which are engaged by a fastening device to secure the clamp at the proper point to engage the carriage wheels. By providing longitudinal series of these transverse openings the clamps may be adjusted to accommodate wheels of different diameters, as will be readily understood upon reference to Fig. 1. The clamp consists of an inner member 6 constructed of sheet metal and having a stem or shank 7 and a head or wheel-engaging jaw 8 disposed at right angles to the said stem or shank and having a convex face, indicated at 9, to engage the tire and rim of the wheel, as will be readily understood. The shank is provided adjacent the clamping jaw with a transverse opening 10 through which a bolt may be inserted to secure the several parts together, and near its lower end a second opening 11 is provided to register with one of the openings 5 in the rib and receive a securing bolt.

At an intermediate portion of the shank 7, a hollow boss 12 is pressed outwardly therefrom, the inner face of the boss constituting a socket adapted to receive a similar boss on a co-acting member. The smaller clamping member consists of a shank or stem 14 having a boss 13 struck up therefrom near its lower end and merging at its upper end into a clamping jaw or head 15 adapted to engage the wheel on the side opposite the jaw 8, as shown clearly in Fig. 2. An opening 16 is formed in the shank 14 adjacent the clamping head and is adapted to register with the opening 10 in the main clamping member to receive a bolt 17, which is equipped with a wing nut 18 adapted to be turned home against the outer clamping member and thereby secure the two jaws 8 and 15 firmly in engagement with the rim and tire of the wheel. The shank 14 is shorter than the shank 7 and rests against a locking plate or lower support 19.

The locking plate 19 is fitted against the rib 4 with its upper end extending between the shanks 7 and 14, being provided with an opening 20 near its lower end which registers with the opening 11 and near its upper end with a boss 21 adapted to seat in the boss 12 of the inner clamping member 6 and receive the boss of the outer clamping member, whereby the several members will be held in proper position upon the runner and reinforced so that collapse of the device, under the weight imposed thereon by the carriage, will be prevented. A bolt 22 is inserted through the openings 11, 5 and 20 and equipped with a nut 23 which is turned home against the brace or locking plate 19, as shown, to secure the device firmly to the runner.

The several parts of the clamp are composed of sheet metal and may be stamped up by any well known method so that the cost of manufacture will be very slight and the device may be placed on the market at a low cost. The shorter member of the clamp rests directly upon the upper edge of the longitudinal rib of the runner, so that the weight of the carriage will be transmitted directly to the runner, and by providing a plurality of shanks or stems which are fitted together by means of the sockets shown, I obtain a very strong support, so that considerable weight may be placed in the carriage without any fear of the clamps becoming separated and thereby permitting collapse of the structure. The parts may be rapidly fitted together and when assembled will be effectually held against independent movement.

Having thus described my invention, what I claim as new, is:—

1. An attachment for baby carriages comprising a sled runner, a clamping member resting on the said runner, a second clamping member co-acting with the first mentioned member, a reinforcing plate fitting against the runner and against the clamping member resting thereon, means for securing the two clamping members together, and means for securing the first-mentioned clamping member and the reinforcing plate to the runner.

2. An attachment for baby carriages comprising a runner having a longitudinal rib on its upper side, a clamping member bearing against the side of said rib, a clamping member co-acting with the first-mentioned clamping member, means for securing the clamping members together, a reinforcing plate bearing against one side of the rib of the runner and against the first mentioned clamping member bearing against the opposite side of said rib, and means for securing said clamping member and said reinforcing plate to the rib.

3. An attachment for baby carriages comprising a runner, a pair of clamping members, means for securing the clamping members together, a reinforcing plate fitting against the runner and one of the clamping members, and means for securing said clamping member and the reinforcing plate to the runner, the clamping members and the reinforcing plate being constructed with interengaging socketed bosses.

4. An attachment for carriages comprising a runner, a pair of clamping members, means for securing the clamping members together, a reinforcing plate fitting against the runner and one of the clamping members, means for securing said clamping member and the reinforcing plate to the runner, and interengaging means on the clamping members and the reinforcing plate to prevent movement of one relative to either of the others.

In testimony whereof I affix my signature in presence of two witnesses.

SVEN W. FRANSSON. [L. S.]

Witnesses:
THEODORE GRANDIN,
J. W. LAMOREAUX.

---

Copies of this patent may be obtained for five cents each, by addressing the "Commissioner of Patents, Washington, D. C."